United States Patent
Eversmann et al.

(10) Patent No.: US 7,943,907 B2
(45) Date of Patent: May 17, 2011

(54) METHOD AND CIRCUIT ARRANGEMENT FOR DETERMINING THE RADIATION INTENSITY USING DIRECTLY COUNTING DETECTOR

(75) Inventors: Björn-Oliver Eversmann, Palzing (DE); Björn Heismann, Erlangen (DE); Debora Henseler, Erlangen (DE); Silke Janssen, Heroldsbach (DE); Daniel Niederlöhner, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 55 days.

(21) Appl. No.: 12/320,160

(22) Filed: Jan. 21, 2009

(65) Prior Publication Data

US 2009/0194703 A1 Aug. 6, 2009

(30) Foreign Application Priority Data

Jan. 21, 2008 (DE) .......................... 10 2008 005 373

(51) Int. Cl.
*G01J 1/42* (2006.01)

(52) U.S. Cl. ...................................... 250/395

(58) Field of Classification Search ............... 250/395
See application file for complete search history.

(56) References Cited

U.S. PATENT DOCUMENTS

| | | | | |
|---|---|---|---|---|
| 4,152,596 A | * | 5/1979 | Marshall, III | 250/358.1 |
| 4,591,984 A | | 5/1986 | Mori | |
| 5,393,982 A | * | 2/1995 | Mott et al. | 250/370.06 |
| 2006/0276706 A1 | | 12/2006 | Klein et al. | |

FOREIGN PATENT DOCUMENTS

DE 10 2007 034 982 5    2/2009

OTHER PUBLICATIONS

Coates et al., "Measurement of gain changes in photomultiplier," 1981, Journal of Physics E: Scientific Instruments, vol. 14, pp. 1164-1166.*
German Office Action, Feb. 20, 2009.

* cited by examiner

*Primary Examiner* — David P Porta
*Assistant Examiner* — Kiho Kim
(74) *Attorney, Agent, or Firm* — Harness, Dickey & Pierce, P.L.C.

(57) ABSTRACT

A method and a circuit arrangement are disclosed for determining radiation intensity using counting detectors or detector elements, in which x-ray radiation photons, which are either absorbed or absorbed in part, generate electrical signals, the pulse number and pulse height of which is correlated to an incident radiation intensity, and the radiation intensity is at least determined by counting the pulses. According to at least one embodiment of the invention, the signal pulses incident on at least one detector or detector element are detected simultaneously by at least one continuously operating pulse height discriminator and by at least one pulse height discriminator operating in a clocked fashion, with the number of incident signal pulses being determined with the aid of these two items of detection information.

13 Claims, 6 Drawing Sheets

| | KD ↗ | KD ↘ | GD | # |
|---|---|---|---|---|
| P1 | - | - | 0 | 0 |
| P2 | - | - | 0 | 0 |
| P3 | 1 | 0 | - | 1 |
| P4 | - | - | 1 | 0 |
| P5 | 0 | 1 | - | 0 |
| P6 | - | - | 0 | 0 |

| | KD ↗ | KD ↘ | GD | # |
|---|---|---|---|---|
| P1 | - | - | 0 | 0 |
| P2 | - | - | 0 | 0 |
| P3 | 1 | 0 | - | 1 |
| P4 | - | - | 1 | 0 |
| P5 | - | - | 1 | 1 |
| P6 | 0 | 1 | - | 0 |
| P7 | - | - | 0 | 0 |

METHOD AND CIRCUIT ARRANGEMENT FOR DETERMINING THE RADIATION INTENSITY USING DIRECTLY COUNTING DETECTOR

PRIORITY STATEMENT

The present application hereby claims priority under 35 U.S.C. §119 on German patent application number DE 10 2008 005 373.2 filed Jan. 21, 2008, the entire contents of which is hereby incorporated herein by reference.

FIELD

At least one embodiment of the invention generally relates to a method for determining radiation intensity using a detector having counting detector elements, in which radiation photons, which are either absorbed or absorbed in part in the detector elements, generate pulse-shaped electrical signals, the pulse number and pulse height of which is correlated to the radiation intensity incident on the detector element, and the radiation intensity is determined by counting the pulses. Moreover, at least one embodiment of the invention generally relates to a circuit arrangement for determining the radiation intensity using a detector having counting detector elements, in which radiation photons, which are either absorbed or absorbed in part in the detector elements, generate pulse-shaped electrical signals, the number and possibly the height of which is correlated to an incident radiation intensity, and the incident radiation intensity can be estimated by counting the signals.

BACKGROUND

Counting detector concepts are starting to be developed in the field of computed tomography. Here, processing the high photon fluxes which occur in CT is a problem.

To this end, one detection method uses direct conversion semiconductor materials. Here, an absorbed photon creates free charges which are propelled to the electrode by way of an applied electric field so that an electrical pulse is generated. The area (and approximately also the height) of this pulse is proportional to the amount of charge and hence to the energy of the absorbed photon. Accurate scanning and digitizing of the generated electrical pulses, in particular resolving the height and number of the occurring pulses, is nontrivial.

The patent application with the reference number DE 10 2007 034 982.5, which was not published before the priority date of the present patent application, illustrates an option for increasing the robustness against a variation of the pulse width in the case of clocked signal scanning by setting the scanning frequency so high that as a result of this the scanning interval is greater than the average expected pulse width. However, this method does not achieve optimal energy resolution in the case of low photon fluxes at the detector.

SUMMARY

In at least one embodiment of the invention, an improved method and an improved circuit arrangement are disclosed for determining the radiation intensity using counting detector elements, which are able to output sufficiently accurate values, even in the case of high photon flux rates.

The inventors have recognized the following:

One approach for determining the radiation intensity using counting detector materials is the use of a continuous pulse height discriminator. Here, a count event is generated every time the signal exceeds a set threshold. This continuous pulse height discriminator has the advantage that it can determine the height of the signals very accurately by varying one or more threshold heights and can in the process determine the count rate independently of a varying pulse width. However, this method assumes a relatively low photon flux rate, that is to say signal pulses which do not overlap.

In the case of very high fluxes, the concept provides very underestimated count readings, all the way to a paralyzing behavior. This property can be explained by the fact that the continuous pulse height discriminator always reacts to a pulse edge of the signal at the set threshold. Due to the fact that in the case of high photon flux rates the pulses are superposed on one another in such a fashion that the signal no longer drops below the threshold between a number of pulses, the pulses cannot be resolved and counted. That is to say, the count rate decreases with increasing photon flux.

A second approach is to use a clocked pulse height discriminator, which compares the signal height with a threshold at certain times and which generates a count event in the case of the threshold being exceeded. Although this concept has the property of underestimating the correct number of pulses in the case of high fluxes (like the continuously operating pulse height discriminator), it does not exhibit a paralyzing behavior. In the case of low flux rates, the count rate directly depends on the average pulse width, so variations in the latter could be problematic. Furthermore, the temporally random scanning of this signal compared to a given pulse form means that the pulse height is usually not scanned at the maximum, which results in a worsened energy transmission behavior.

These method-specific problems can be solved by a logical evaluation of time-continuous and time-discrete comparator decisions.

If the signals originating from a detector with direct conversion semiconductor materials as sensors are investigated simultaneously by both discriminator concepts, and the output signals of both discriminators are evaluated by a logic, then it is possible for the advantage of the correct energy discrimination of the signals by a continuous pulse height discriminator in the case of low fluxes to be combined with the use of the clocked pulse height discriminator in the case of high fluxes to avoid too strong an underestimate of the count rate. To this end, the count events for count electronics can be generated using a logical operation, with the logical operation ensuring that no over- or under-evaluation of the count signals coming from the pulse height discriminator occurs.

If both pulse height discriminators are operated in parallel, with each pulse height discriminator outputting its count signals to a combined counter, a logic circuit can be arranged between the counter and the continuous or clocked pulse height discriminator, which circuit ignores the first event of the clocked pulse height discriminator after exceeding the threshold—that is to say a count event of the continuous pulse height discriminator—in order to avoid constant double—and hence false—detection of signals. Furthermore, the frequency of the clocked pulse height discriminator should in this case be adjusted to the maximum expected pulse width, so that double detection does not occur without superposition of pulses.

Within the scope of at least one embodiment of the invention, this procedure can also be carried out in a logically corresponding manner when passing through a threshold from above to below, that is to say having a negative gradient of the signal strength.

It is also advantageous if the scanning frequency is selected depending on the expected energy spectrum of the measured radiation in the case of a very wide distribution of pulse widths, that is to say a wide energy spectrum of the detected radiation. For example, measurements within the scope of CT with photon energies of the order of approximately 100 keV can use a relatively high scanning rate, and a substantially lower scanning rate can be used for PET measurements with radiation energy of 511 keV.

The advantages of this concept according to at least one embodiment of the invention are an improved transmission of signal height and hence transmission of energy compared to only using a clocked pulse height discriminator, with significantly reduced count rate drop-offs in the case of high fluxes compared to a continuous pulse height discriminator. This method does not exhibit paralyzing behavior. Furthermore, the count rate to be determined for a variation width of the order of a clock cycle does not depend on the variation of the pulse width.

According to this basic concept described above, the inventors propose a method, in at least one embodiment, for determining radiation intensity using a detector having counting detector elements, in which radiation photons, which are either absorbed or absorbed in part in the detector elements, generate pulse-shaped electrical signals, the pulse number and pulse height of which is correlated to the radiation intensity incident on the detector element, and the radiation intensity is determined by counting the pulses. According to at least one embodiment of the invention, the signal pulses incident on at least one detector element are now detected simultaneously by at least one continuously operating pulse height discriminator and by at least one pulse height discriminator operating in a clocked fashion, with the number of incident signal pulses being determined with the aid of these two items of detection information.

In one advantageous embodiment, the clocked and the continuous pulse height discriminator have an output for emitting their detected signal information, with logically combining the outputs of the at least one continuously operating pulse height discriminator and the at least one pulse height discriminator operating in a clocked fashion ensuring that a continuing pulse count is effected by the pulse height discriminator operating in a clocked fashion in the case of the continuously operating pulse height discriminator being saturated.

In accordance with a first embodiment variant, which targets the rising pulse edge of the detector signals, it is possible to connect a logical operation between the output of the continuously operating pulse height discriminator and the output of the pulse height discriminator operating in a clocked fashion such that after every time the continuously operating pulse height discriminator exceeds a lower threshold representing a positive count event for the continuously operating pulse height discriminator, a first count event is not counted in the pulse height discriminator operating in a clocked fashion, whereas all other count signals of both pulse height discriminators are counted. In the process, the at least one continuously operating pulse height discriminator can emit a rising pulse edge signal in addition to its count signal when passing through a threshold with a positive gradient. In this variant, the logical operation of the count signals of the continuously operating pulse height discriminator and the pulse height discriminator operating in a clocked fashion are summed, with respectively one count signal of the pulse height discriminator operating in a clocked fashion following a rising pulse edge signal being ignored.

A similar alternative embodiment variant takes into account the falling pulse edge of the detector signals, it being the case that a logical operation is used between the output of the continuously operating pulse height discriminator and the output of the pulse height discriminator operating in a clocked fashion such that every time a lower threshold on the continuously operating pulse height discriminator is undershot, a count event of the pulse height discriminator operating in a clocked fashion is canceled, whereas all other count signals of both pulse height discriminators are counted. In this variant it is also expedient if the at least one continuously operating pulse height discriminator can emit a falling pulse edge signal in addition to its count signal when passing through a threshold with a negative gradient. In the process, it is possible for the logical operation to sum the count signals of the continuously operating pulse height discriminator and the pulse height discriminator operating in a clocked fashion, with respectively one earlier count signal of the pulse height discriminator operating in a clocked fashion being canceled after a falling pulse edge signal.

In addition to the embodiments described above, it is possible for the continuously operating pulse height discriminator to be used also to at least determine the pulse height. Hence the spectral distribution of the detected radiation can be determined using the pulse height measurement.

In addition to the method according to at least one embodiment of the invention, the inventors also propose a circuit arrangement for determining the radiation intensity using a detector having counting detector elements, in which radiation photons, which are either absorbed or absorbed in part in the detector elements, generate pulse-shaped electrical signals, the number and possibly the height of which is correlated to an incident radiation intensity, and the incident radiation intensity can be estimated by counting the signal pulses. According to at least one embodiment of the invention, one continuously operating pulse height discriminator and a pulse height discriminator operating in a clocked fashion are in the process connected in parallel to one output of the detector element, every pulse height discriminator has an output, and the outputs of the at least one continuously operating pulse height discriminator and the at least one pulse height discriminator operating in a clocked fashion are connected to a counter via a logic circuit.

In the case of such a circuit arrangement, the output of the continuously operating pulse height discriminator can emit a rising pulse edge signal if a threshold is passed with a positive gradient and/or a falling pulse edge signal if a threshold is passed with a negative gradient.

On the one hand, the logic circuit can be designed such that if a rising pulse edge signal occurs, then the next count signal of the pulse height discriminator operating in a clocked fashion is not counted. On the other hand, it is also possible for the logic circuit to be designed such that if a falling pulse edge signal occurs, then a count signal of the pulse height discriminator operating in a clocked fashion is not counted.

In an alternative embodiment, the output of the continuously operating pulse height discriminator can be connected to a switch, which only enables a connection between the pulse height discriminator operating in a clocked fashion and a counter in the case of a positive count occurrence of the continuously operating pulse height discriminator.

Paralysis states are also avoided in this variant, with it additionally being possible to detect the pulse height distribution or energy distribution of the photon flux by means of the continuously operating pulse height discriminator when the photon flux is not too great.

The person skilled in the art knows that such logic circuits can be designed either based on hardware or by appropriate programming.

BRIEF DESCRIPTION OF THE DRAWINGS

In the following text, the invention will be described in more detail on the basis of the example embodiments with the aid of the figures, with only the features required for understanding the invention being illustrated. In the process, the following reference symbols are used: 1: CT system, 2: first x-ray tube, 3: first detector, 3.$m.n$: detector element in column m and row m, 4: second x-ray tube (optional), 5: second detector (optional), 6: gantry housing, 7: patient, 8: patient couch, 9: system axis, 10: control and computational unit, 11: signal, 12: amplifier, 13: continuous pulse height discriminator (KD), 14: clocked pulse height discriminator (GD), 15: logic circuit, 16: summing counter, 17: threshold, 18: signal profile, 19: clock event of the clocked pulse height discriminator, 20: behavior of the continuous pulse height discriminator, I/b.E.: signal intensity in arbitrary units, P1-P7: output events at the pulse height discriminators, $Prg_1$-$Prg_n$: computer programs, S1-S4: states of the logic circuit, t/b.E.: time in arbitrary units.

In detail.

DETAILED DESCRIPTION OF THE EXAMPLE EMBODIMENTS

Figure 1:
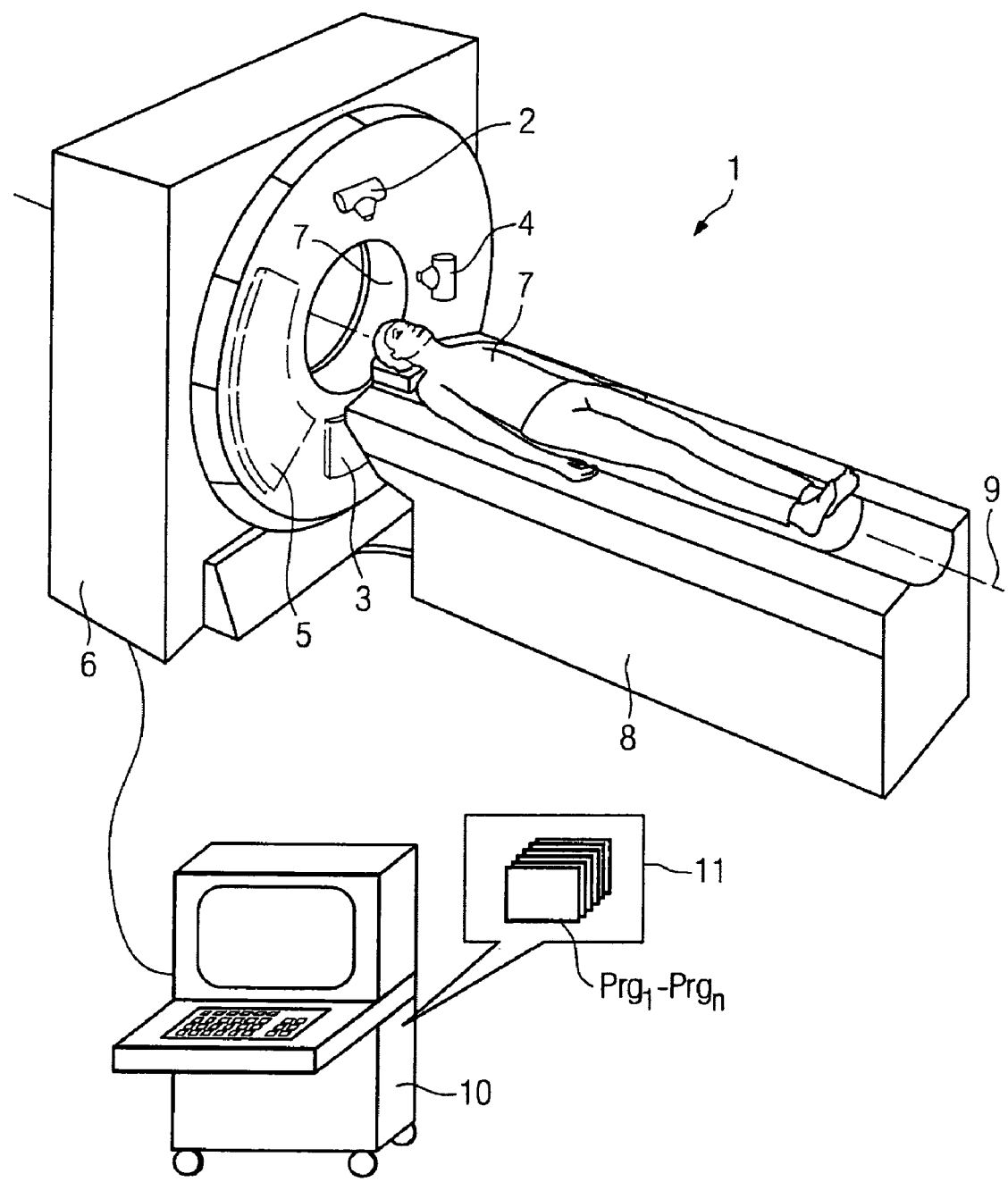
FIG. 1: shows a CT system with a detector according to an embodiment of the invention.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The method according to an embodiment of the invention and the circuit arrangement according to an embodiment of the invention can be used in connection with any detectors with counting detector elements, such as direct conversion semiconductor materials.

FIG. 1 illustrates only in an exemplary manner here a computed tomography system with detectors designed according to an embodiment of the invention. This CT system 1 has a gantry housing 6 containing a gantry with a radiation source 2 which, together with an opposing detector 3, rotates about a system axis 9. Optionally, at least one second radiation source 4 and an opposing detector 5 can be arranged on the gantry. Depending on the configuration, this can increase the scanning rate or achieve a different scanning method, such as phase-contrast scanning. For the purposes of scanning, a patient 7, for example, is pushed through the measurement field on a patient couch 8, while the radiation sources 2, 4 and the detectors 3, 5 rotate on the gantry about the system axis 9.

The signals detected by the detector 3 and/or 5 can directly be processed in detector electronics in a manner according to an embodiment of the invention, or are processed in a central computational station 10 after appropriate amplification. Computer programs $Prg_1$-$Prg_n$, which, when operating, inter alia carry out the method according to an embodiment of the invention, can also be stored there.

Reference is made to the fact that the method according to embodiments of the invention and the circuit arrangement according to embodiments of the invention are not limited to tomographic applications, rather they can be applied to any particle- or photon-detecting detector with counting detector elements.

Figure 2:
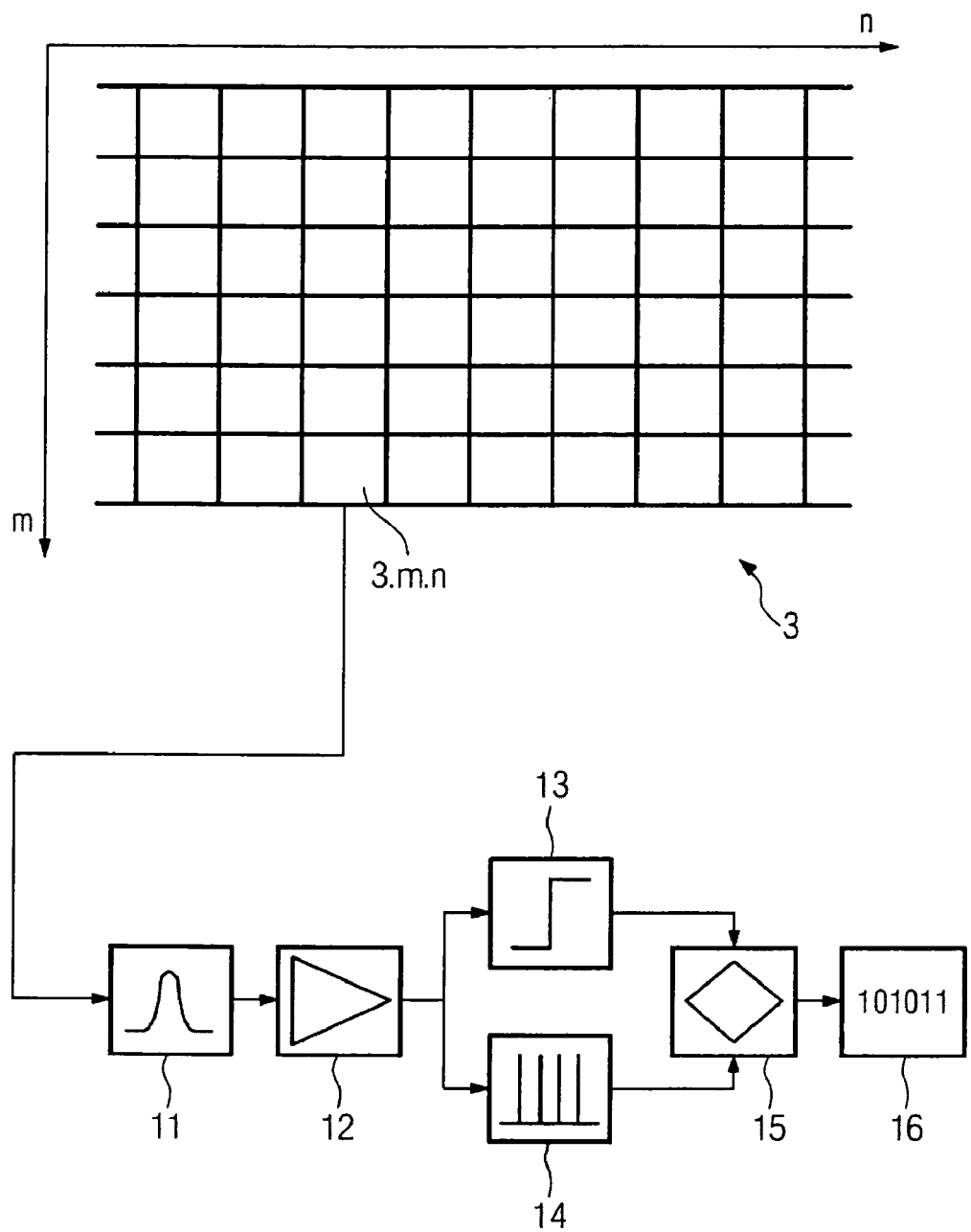
FIG. 2: shows a detector with detector elements having a direct conversion semiconductor and a count switching circuit with logic circuit according to an embodiment of the invention.

A first and preferred variant of a circuit arrangement is illustrated schematically in FIG. 2. It shows the detector 3 with a multiplicity of detector elements 3.$m.n$. arranged in a checkerboard design, which in each case transmit their signals 11 to an amplifier 12. The electrical signals 11 are amplified in the amplifier 12, and transmitted to the continuously operating pulse height discriminator 13 and the pulse height discriminator 14 operating in a clocked fashion which is switched in parallel. Count signals are generated in the pulse height discriminators 13 and 14 in accordance with the received signal and in accordance with the respective mode of operation, which count signals are then transmitted to the downstream logic circuit 15. The count signals are transmitted to the counter 16 in accordance with the logic circuit according to an embodiment of the invention.

In this case, the logic circuit is designed such that every time a lower threshold, representing a positive count event for the continuously operating pulse height discriminator, is exceeded on the continuously operating pulse height discriminator 13, a first count event of the pulse height discriminator 14 operating in a clocked fashion is not counted, whereas all other count signals of both pulse height discriminators 13 and 14 are transmitted.

Figure 3:
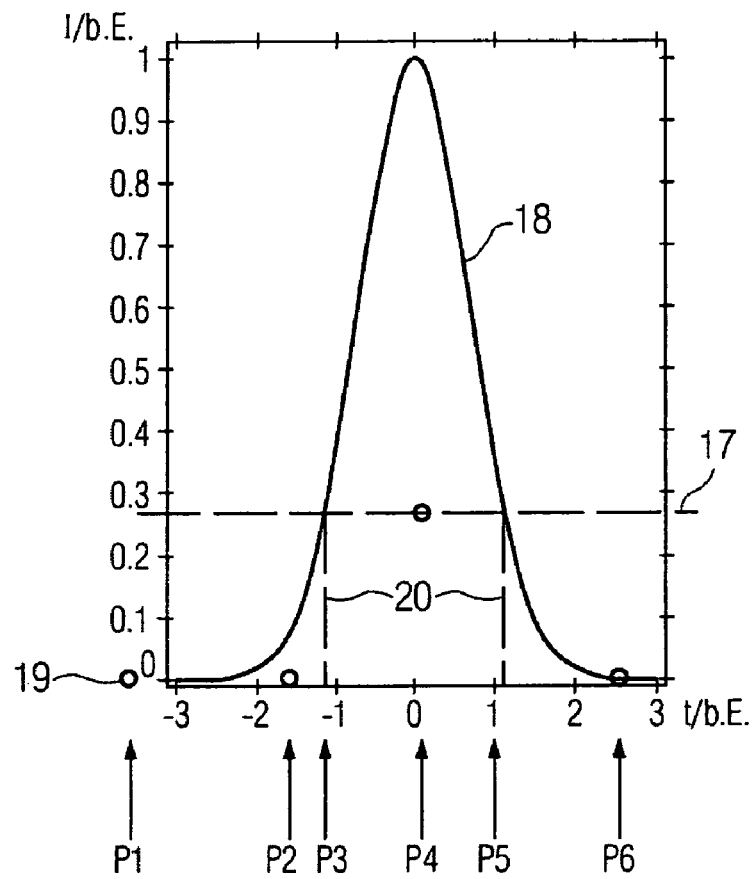
FIG. 3: shows a detector signal of a single photon absorption with evaluation in the continuous and clocked pulse height discriminators.

The behavior of the algorithm when a pulse is detected is shown in FIG. 3. The top shows a diagram of the profile 18 of the detector signal, which is plotted as detected current I/b.E. against time t/b.E. The circles 19 represent the behavior of the clocked pulse height discriminator 14, with circles lying at the bottom representing cycles without a count and circles lying on top representing cycles with a positive count. The line 20 shows the behavior of the continuously operating pulse height discriminator 13, which emits a rising pulse edge signal at P3, where the detector signal 18 exceeds the threshold 17, and which emits a falling pulse edge signal at P5, where the threshold 17 is undershot.

This situation is illustrated in the table arranged below the diagram. Here the event positions P1 to P6 are entered in the first column; the second column contains the rising pulse edge signals of the continuously operating pulse height discriminator (here the bits 0 or 1); the third column correspondingly shows the falling pulse edge signals; the fourth column contains the signals of the pulse height discriminator operating in a clocked fashion, and the last column illustrates the count signals emitted by the logic circuit to the counter.

As a result of the described logic, only the one count signal of the continuously operating pulse height discriminator is actually counted in this example showing a single electrical pulse, while the first—and in this case only—count signal of the pulse height discriminator operating in a clocked fashion is ignored.

Figure 4:
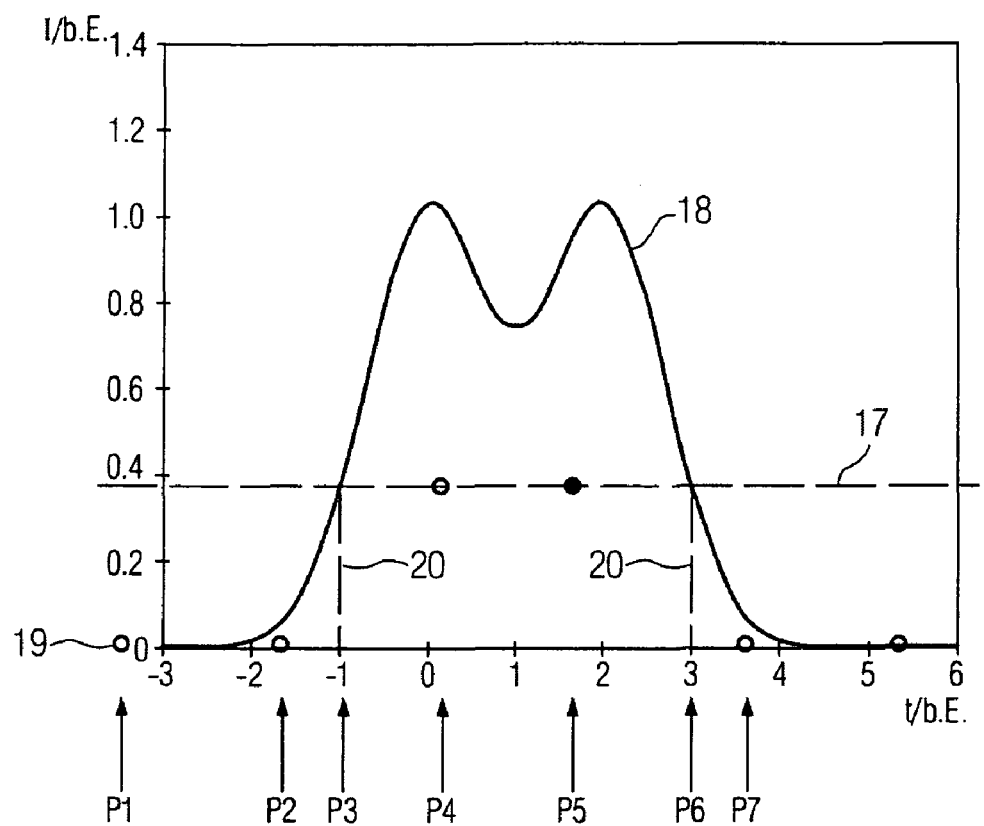
FIG. 4: shows a detector signal of a single photon absorption with evaluation in the continuous and clocked pulse height discriminators.

While FIG. 3 illustrates one pulse event, FIG. 4 similarly shows the occurrence of two slightly overlapping pulse events, represented in this case by the two peaks in the signal profile 18 lying close to one another. In accordance with the previously described count logic, the first (and only) count event of the continuously operating pulse height discriminator is again counted in this case. Since the signal level between the two peaks does not fall below the threshold, there is no further count signal from the continuously operating pulse height discriminator, even though another signal follows. If further pulse events were to follow in quick temporal succession, these also would not be resolvable by the continuously operating pulse height discriminator.

According to an embodiment of the invention, this problem is now circumvented by virtue of the fact that subsequently all count signals of the pulse height discriminator operating in a clocked fashion, in this case the count signal at position P5, are counted. In this manner, on the one hand, paralysis in the pulse counting is avoided in the case of pulse events in quick temporal succession, with it nevertheless being possible to use the advantages of a continuously operating pulse height discriminator in the case of temporally sufficiently spaced pulse events—that is to say low radiation intensities—and a spectral resolution of the measured radiation by a continuously operating pulse height discriminator is made possible.

The described logic in the case of the double pulse event is illustrated once again in the table arranged below the diagram. Here, the event positions P1 to P7 are entered in the first column; the second column contains the rising pulse edge signals of the continuously operating pulse height discriminator (here the bits 0 or 1); the third column correspondingly shows the falling pulse edge signals; the fourth column contains the signals of the pulse height discriminator operating in a clocked fashion, and the last column illustrates the count signals emitted by the logic circuit to the counter. That is to say, in the illustrated example, two count signals are also emitted in accordance with the actual event.

Figure 5:
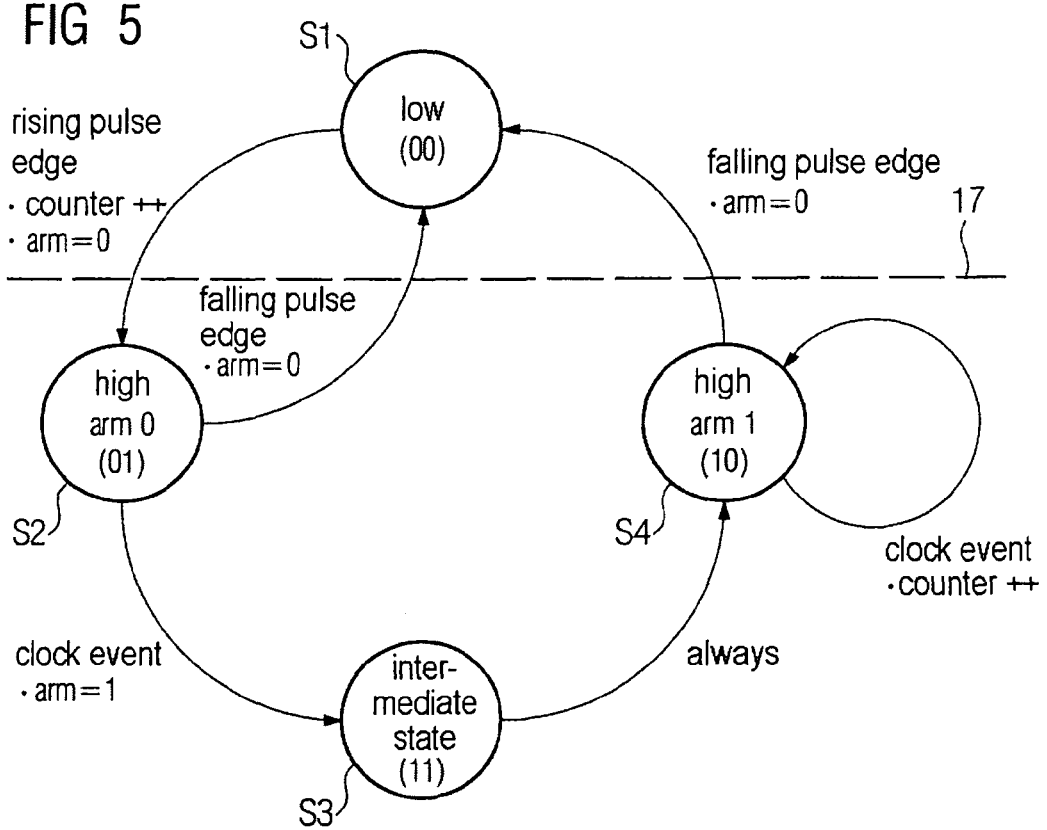
FIG. 5: shows a schematic illustration of a logic circuit in accordance with FIG. 2 as a "state machine"

The logic described above is yet again reproduced in FIG. 5 in the form of a state transition diagram of a "state machine" or a "finite state machine".

This diagram shows the logic states S1 to S4 of the logic circuit. The movement of the system between the different states S1-S4 is controlled by the events "rising pulse edge", "falling pulse edge" and "clock event". Additionally there is a state variable "arm", which stores whether the signals of the pulse height discriminator operating in a clocked fashion are counted.

In the case of no signal lying above a threshold, the system is in state S1. The system leaves this state for the state S2 if the event "rising pulse edge" of the continuously operating pulse height discriminator occurs. Moreover, during this transition, a count signal "counter ++" is triggered and the variable "arm" is set to "0".

If the event "falling pulse edge" of the continuously operating pulse height discriminator occurs in the state S2, the system returns to the state S1.

If the event "clock event" of the pulse height discriminator operating in a clocked fashion occurs in the state S2, the system switches into the state S4 via the intermediate state S3, with the variable "arm" being set to "1".

If the event "clock event" of the pulse height discriminator operating in a clocked fashion occurs in the state S4, the system remains in the state S4; however, a count signal "counter ++" is triggered.

If the event "falling pulse edge" of the continuously operating pulse height discriminator occurs in the state S4, the system switches into the state S1, with additionally the variable "arm" being set to "0".

In this case, the variable "arm" is required in order to decide whether a "clock event" is counted (case "arm"="1"), or whether it is not counted (case "arm"="0"). This makes it possible for the first "clock event" after a rising pulse edge signal not to be counted. Furthermore, the following designations are used in this diagram: "low": there is no event above the threshold, "high": the signal is above the threshold, "arm1": variable "arm"="1", and "arm0": variable "arm"="0".

Figure 6:
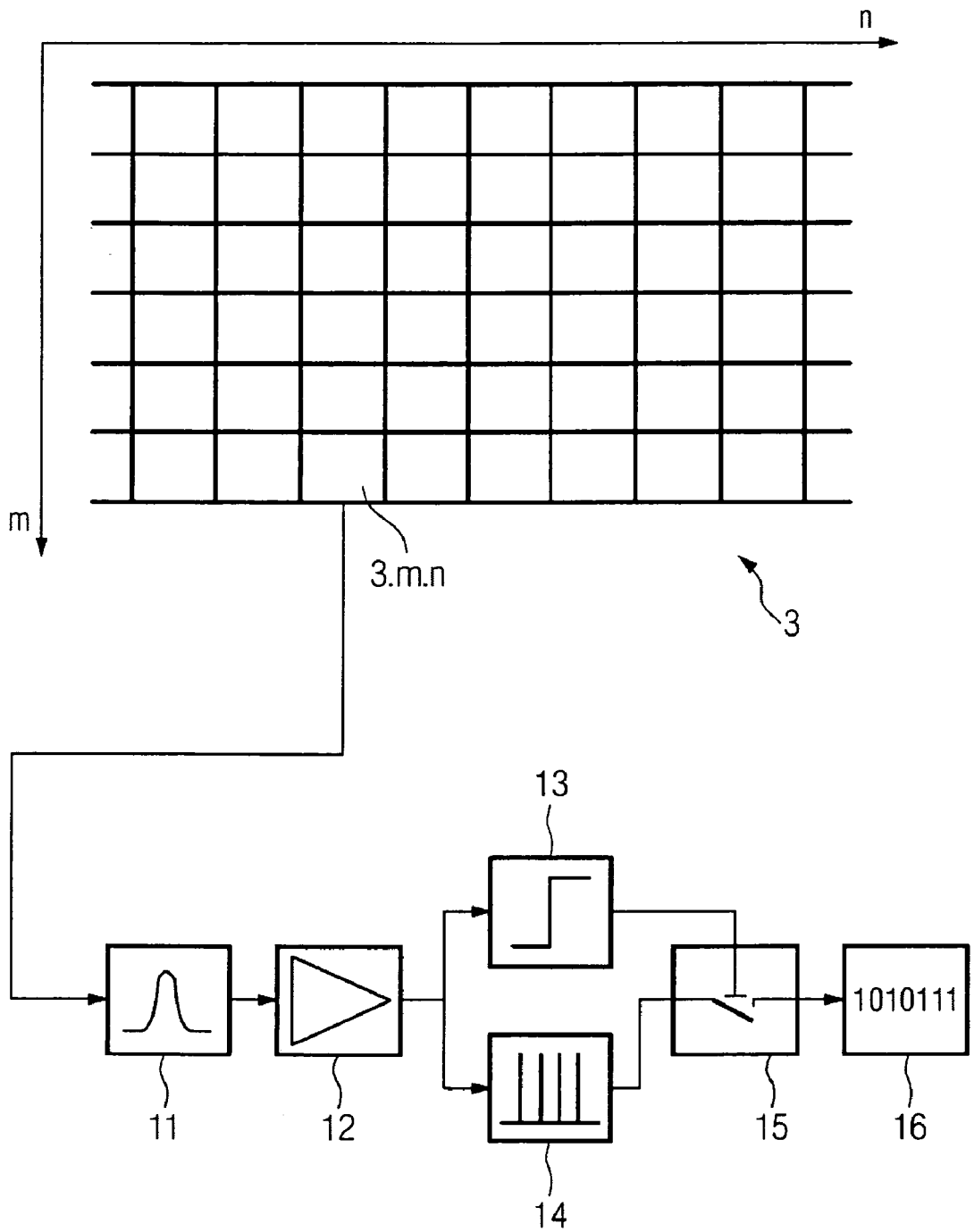
FIG. 6: shows a detector with detector elements having a direct conversion semiconductor and an alternative count switching circuit according to an embodiment of the invention with a controlled switch.

Another alternative variant for parallel operation of a continuously operating pulse height discriminator and a pulse height discriminator operating in a clocked fashion is described in FIG. 6. In principle, it is possible to use the same design of the circuit arrangement as described in FIG. 2; however a switch, controlled by the count signal of the continuously operating pulse height discriminator 13, is used as logic circuit 15, which only permits count signals of the pulse height discriminator 14 operating in a clocked fashion to pass to the counter 16 when a positive count signal is applied. The switch can also be controlled such that the emitted bit for a rising pulse edge signal closes the switch in the logic circuit 15, while a falling pulse edge signal opens the switch. This makes it possible to vary the sensitivity of the circuit arrangement by adjusting the threshold, to measure the spectral radiation distribution in parallel on the continuously operating pulse height discriminator, and there is no danger of paralysis of the circuit arrangement as a result of excessively high radiation intensities.

The pulse height discriminator operating in a clocked fashion can also be used to determine the time duration of the electrical signal above the prescribed threshold. To this end, the clock rate of the pulse height discriminator operating in a clocked fashion can be significantly higher than would result from the maximum pulse width of the measured radiation. Statistical considerations can be used to estimate the number of impulses during the abovementioned time period, and hence underestimating the count rate can be avoided as far as possible.

It is understood that the abovementioned features of the invention can be used not only in the respectively specified combination, but also in other combinations or on their own, without departing from the scope of the invention.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for determining radiation intensity using a detector having counting detector elements, comprising:
   generating, via radiation photons which are either absorbed or absorbed in part in the detector elements, pulse-shaped electrical signals, a number and height of the generated pulse-shaped electrical signals being correlated to a radiation intensity incident on the detector elements; and
   determining radiation intensity by counting the number of generated pulse-shaped electrical signals, generated pulse-shaped electrical signals incident on at least one detector element being detected simultaneously by at least one continuously operating pulse height discriminator and by at least one pulse height discriminator operating in a clocked fashion, and the number of incident generated pulse-shaped electrical signals being determined using detection information from the at least one continuously operating pulse height discriminator and the at least one pulse height discriminator operating in a clocked fashion, wherein
   a logical operation between the output of the at least one continuously operating pulse height discriminator and the output of the at least one pulse height discriminator operating in a clocked fashion is used such that after every time the at least one continuously operating pulse height discriminator exceeds a threshold representing a positive count event for the at least one continuously operating pulse height discriminator, and wherein a first count event is not counted in the at least one pulse height discriminator operating in a clocked fashion, whereas all other count signals of both the at least one continuously operating pulse height discriminator and the at least one pulse height discriminator operating in a clocked fashion are counted.

2. The method as claimed in claim 1, wherein each of the at least one pulse height discriminator including an output and logically combining outputs of the at least one continuously operating pulse height discriminator and the at least one pulse height discriminator operating in a clocked fashion to ensure that a continuing pulse count is effected by the at least one pulse height discriminator operating in a clocked fashion in the case of the at least one continuously operating pulse height discriminator being saturated.

3. The method as claimed in claim 1, wherein the at least one continuously operating pulse height discriminator is adapted to emit a rising pulse edge signal in addition to the count signal when passing through a threshold with a positive gradient.

4. The method as claimed in claim 3, wherein the logical operation sums the count signals of the at least one continuously operating pulse height discriminator and the at least one pulse height discriminator operating in a clocked fashion, with respectively one count signal of the at least one pulse height discriminator operating in a clocked fashion following a rising pulse edge signal being ignored.

5. The method as claimed in claim 1, wherein a logical operation is used between the output of the at least one continuously operating pulse height discriminator and the output of the at least one pulse height discriminator operating in a clocked fashion such that every time a relatively lower threshold on the at least one continuously operating pulse height discriminator is undershot, an earlier count event of the at least one pulse height discriminator operating in a clocked fashion is canceled, whereas all other count signals of both the at least one continuously operating pulse height discriminator and the at least one pulse height discriminator operating in a clocked fashion are counted.

6. The method as claimed in claim 5, wherein the at least one continuously operating pulse height discriminator is adapted to emit a falling pulse edge signal in addition to the count signal when passing through a threshold with a negative gradient.

7. The method as claimed in claim 6, wherein the logical operation sums the count signals of the at least one continuously operating pulse height discriminator and the at least one pulse height discriminator operating in a clocked fashion, with an earlier count signal of the at least one pulse height discriminator operating in a clocked fashion being canceled after the occurrence of a falling pulse edge signal.

8. The method as claimed in claim 1, wherein the at least one continuously operating pulse height discriminator is also used to at least determine the pulse height.

9. The method as claimed in claim 8, wherein the spectral radiation distribution is determined using the pulse height measurement.

10. A circuit arrangement for determining the radiation intensity using a detector having counting detector elements, in which radiation photons, which are either absorbed or absorbed in part in the detector elements, generate pulse-shaped electrical signals, at least one of a number and height of generate pulse-shaped electrical signals being correlated to an incident radiation intensity, and the incident radiation intensity being estimateable by counting the generated pulse-shaped electrical signals, comprising:
   at least one continuously operating pulse height discriminator; and
   at least one pulse height discriminator operating in a clocked fashion, connected in parallel with the at least one continuously operating pulse height discriminator and connected to one output of the detector element, the at least one continuously operating pulse height discriminator and the at least one pulse height discriminator operating in a clocked fashion each including an output, outputs of the at least one continuously operating pulse height discriminator and the at least one pulse height discriminator operating in a clocked fashion being connected to a counter via a logic circuit, wherein
   the output of the at least one continuously operating pulse height discriminator has a rising pulse edge signal if a threshold is passed with a positive gradient.

11. The circuit arrangement as claimed in claim 10, wherein the output of the at least one continuously operating pulse height discriminator has a falling pulse edge signal if a threshold is passed with a negative gradient.

12. The circuit arrangement as claimed in claim 11, wherein the logic circuit is designed such that if the falling pulse edge signal occurs, then an earlier count signal of the at least one pulse height discriminator operating in a clocked fashion is canceled.

13. The circuit arrangement as claimed in claim 10, wherein the logic circuit is designed such that if the rising pulse edge signal occurs, then the next count signal of the at least one pulse height discriminator operating in a clocked fashion is not counted.

* * * * *